United States Patent
Sasaki et al.

(10) Patent No.: US 8,091,210 B1
(45) Date of Patent: Jan. 10, 2012

(54) METHOD FOR PROVIDING A STRUCTURE IN MAGNETIC RECORDING TRANSDUCER

(75) Inventors: Keith Y. Sasaki, San Jose, CA (US); Christopher T. Ngo, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 980 days.

(21) Appl. No.: 12/042,982

(22) Filed: Mar. 5, 2008

(51) Int. Cl.
*G11B 5/127* (2006.01)
*H04R 31/00* (2006.01)

(52) U.S. Cl. ........... 29/603.16; 29/603.12; 29/603.14; 29/603.15; 29/603.18; 216/62; 216/65; 216/66; 360/119.02; 360/119.04; 360/125.08; 360/125.09; 451/5; 451/41

(58) Field of Classification Search ............ 29/603.07, 29/603.12–603.16, 603.18; 360/119.02, 360/119.04, 125.08, 125.09; 451/5, 8, 10, 451/28, 36, 37, 41
See application file for complete search history.

(56) References Cited

U.S. PATENT DOCUMENTS

| | | | |
|---|---|---|---|
| 5,658,470 A | 8/1997 | Schultz et al. | |
| 7,024,756 B2 | 4/2006 | Le et al. | |
| 7,248,434 B2 | 7/2007 | Dill et al. | |
| 7,444,740 B1 * | 11/2008 | Chung et al. | 29/603.16 |
| 2005/0185332 A1 | 8/2005 | Hsiao et al. | |
| 2005/0241140 A1 | 11/2005 | Baer et al. | |
| 2005/0259355 A1 | 11/2005 | Gao et al. | |
| 2006/0101636 A1 | 5/2006 | Cyrille et al. | |
| 2006/0225268 A1 | 10/2006 | Le et al. | |
| 2007/0183093 A1 | 8/2007 | Le et al. | |

\* cited by examiner

*Primary Examiner* — Paul D Kim

(57) ABSTRACT

A method provides a structure in a magnetic recording transducer. The structure resides on an underlayer. The method includes providing a protective layer and providing layer(s) for the structure. The protective layer covers a field region but exposes a device region in which the structure is to reside. A first portion of the layer(s) reside in the device region, while a second portion of the layer(s) reside in the field region. The method also includes removing the second portion of the layer(s) using an over-removal condition. The underlayer is covered by a remaining portion of the protective layer after the removing step is completed. The method also includes removing the remaining portion of the protective layer. An underlayer removal rate is substantially less than a protective layer during the step of removing of the protective layer.

14 Claims, 8 Drawing Sheets

METHOD FOR PROVIDING A STRUCTURE IN MAGNETIC RECORDING TRANSDUCER

BACKGROUND

Conventional poles and other structures for magnetic recording heads can be fabricated in a number of ways. For example, FIG. 1 is a flow chart depicting a conventional method 10 for fabricating a chemical mechanical planarization (CMPS) support layer of a magnetic recording transducer using a conventional mill-and-refill process. For simplicity, some steps are omitted. FIGS. 2-5 are diagrams a depicting conventional transducer 50 as viewed from the air-bearing surface (ABS) during fabrication. For clarity, FIGS. 2-5 are not drawn to scale. The conventional transducer 50 may be coupled with a slider to form a write head. In addition, a read transducer (not shown) may be included to form a merged head. For simplicity, only a portion of the conventional transducer 50 is shown.

A conventional magnetic seed layer is provided on a planarized underlayer, via step 12. In some transducers, the conventional magnetic seed layer may be used as a pole. The conventional seed layer is used in fabricating a magnetic pole, for example the main pole for a perpendicular magnetic recording transducer. The magnetic seed layer is generally blanket deposited across both a device region, in which the structure is to be fabricated, and a field region away from the device region. However, for other structures, the layer deposited may reside only in the device region. A photoresist mask is provided on the conventional seed layer, via step 14. FIG. 2 depicts the conventional transducer 50 after step 14 is completed. Thus, an underlayer 52, a conventional seed layer 54, and photoresist mask 56 are shown. The underlayer 52 is typically planarized prior to deposition of the conventional seed layer 54. Consequently, the upper surface of the conventional underlayer 52 is substantially flat. The photoresist mask 56 resides substantially in the device region 60. However, the conventional seed layer 54 extends to the field regions 58.

The conventional seed layer is milled with an over-mill condition, via step 16. Because the photoresist mask 56 covers the device portion 60, only the portion of the conventional seed layer 54 in the field regions 58 is removed. The over-mill condition is used to ensure complete removal of the portion of the conventional seed layer 54 in the field regions 58. FIG. 3 depicts the conventional magnetic recording transducer 50 after step 16 has been performed. Because an over-mill condition was used, only the portion of the conventional seed layer 54' in the device region 60 remains. The remainder of the conventional seed layer 54 has been removed.

The magnetic transducer 50 is refilled with alumina, via step 18. The refill is performed while the photoresist mask 56 remains in place. FIG. 4 depicts the conventional magnetic recording device after step 18 has been performed. Thus, alumina layer, including portions 62A, 62B, and 62C, is shown. The alumina layer is shown with portions 62A and 62C residing in the field regions 58 as well as a portion 62B residing on the photoresist mask 56 in the device region 60. The portions 62A and 62C of the alumina layer are to serve as the CMPS layer.

The photoresist mask 56 may be stripped and processing of the device continued, via step 20. FIG. 5 depicts the conventional magnetic transducer 50 after stripping of the photoresist mask in step 20 has been completed. Thus, the seed layer 54' in the device region 60 and the alumina 62A and 62B in the field regions 58 remain. Thus, a CMPS layer has been fabricated. Additional structures (not shown) such as a magnetic pole(s), coil(s), shields, or other components may also be fabricated.

Although the conventional method 10 may be used in providing the conventional transducer 50, there may be drawbacks. The over-mill condition in step 16 allows for complete removal of the conventional seed layer. However, the over-mill condition also results in the underlayer 52 being milled. The portions of the underlayer 52' exposed during the milling, particularly by the over-mill condition, are damaged. As a result, the surface of the underlayer 52' in the field regions 58 is no longer planar. Subsequent layers, such as the alumina 62A and 62B, may also have a topology that is not flat in the field regions 58. Stated differently, there is a greater variation in the step height for the alumina 62A and 62B, which serve as a CMPS layer. This variation may adversely affect the write track width uniformity, result in poor uniformity of the pole trim, and reduced CMP uniformity. Other structures fabricated using processes similar to the method 10 may suffer from similar drawback.

Accordingly, what is needed is an improved method for fabricating structures in a magnetic transducer.

SUMMARY

A method and system for providing a structure in a magnetic recording transducer are disclosed. The structure resides on an underlayer. The method and system include providing a protective layer and providing layer(s) for the structure. The protective layer covers a field region but exposes a device region in which the structure is to reside. A first portion of the layer(s) may reside in the device region, while a second portion of the layer(s) may reside in the field region. The method and system also include removing the second portion of the layer(s) using an over-removal condition. The underlayer is covered by a remaining portion of the protective layer after the removing step is completed. The method and system also include removing the remaining portion of the protective layer. A removal rate of the underlayer is substantially less than a removal rate of the protective layer during the step of removing of the protective layer.

DETAILED DESCRIPTION OF THE PREFERRED EMBODIMENTS

Figure 1:
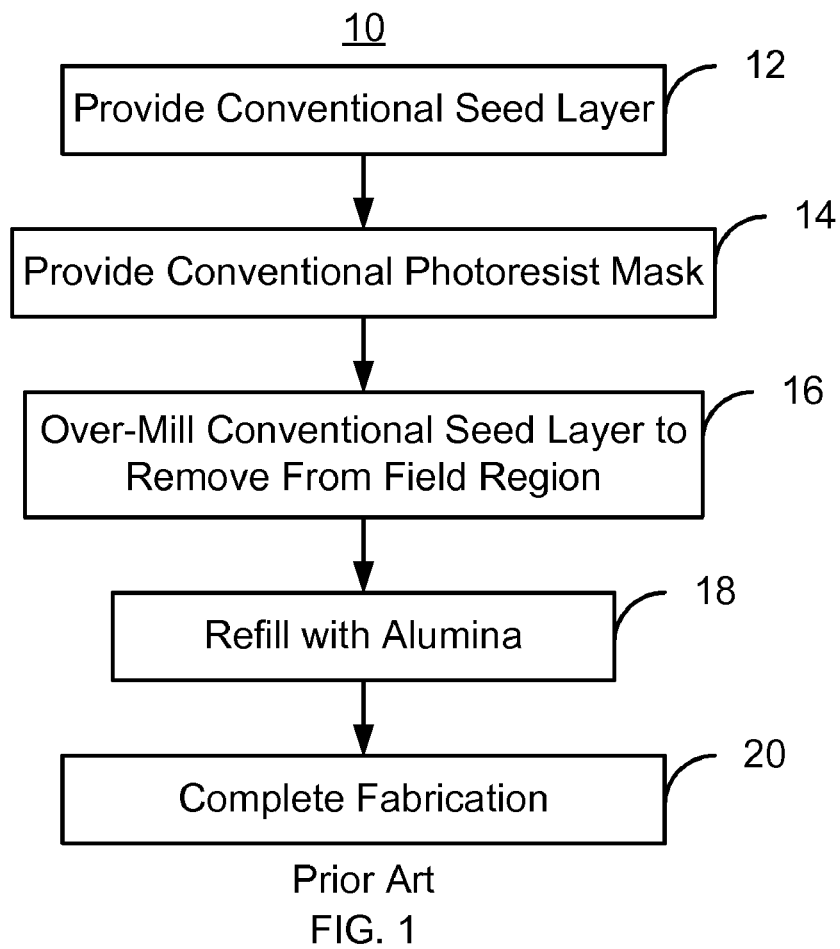
FIG. 1 is a flow chart depicting a conventional method for performing a mill-and-fill process a transducer.
Figure 2:
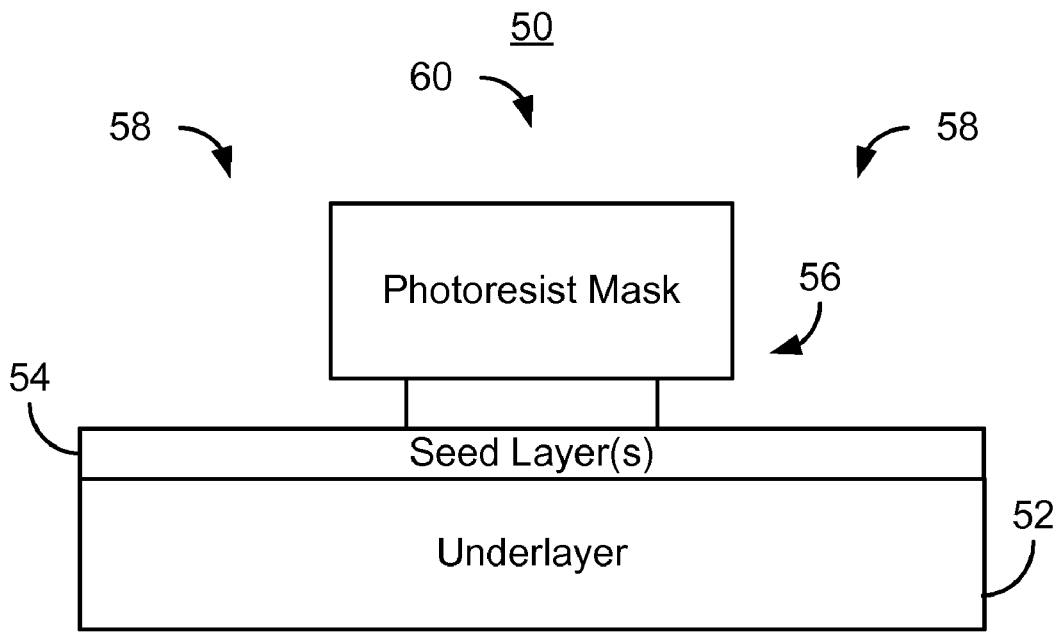
FIGS. 2-5 are diagrams depicting a conventional transducer during fabrication.
Figure 3:
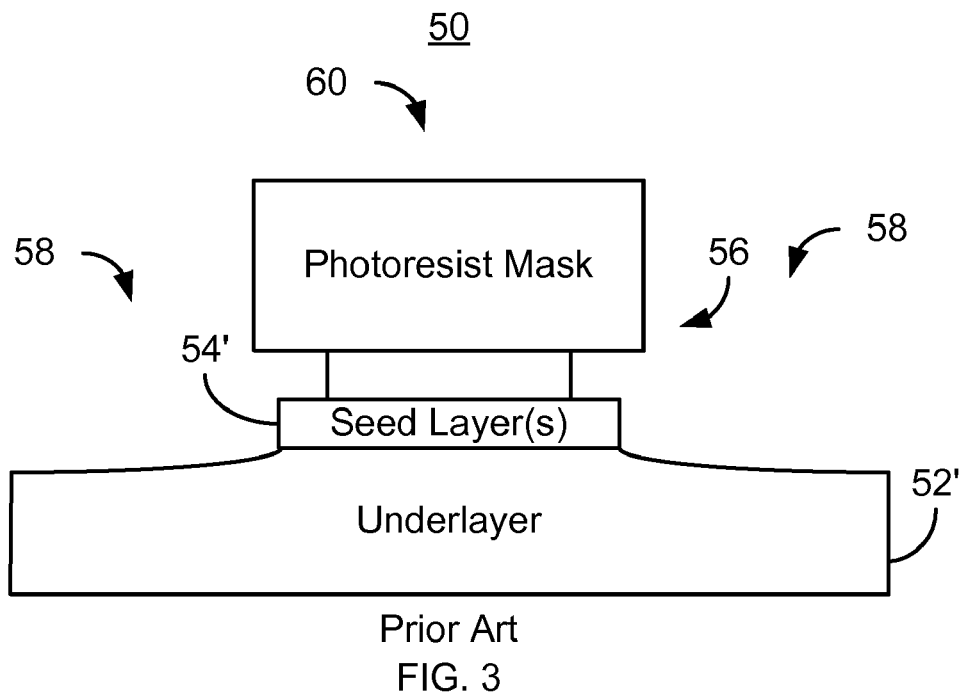
Figure 4:
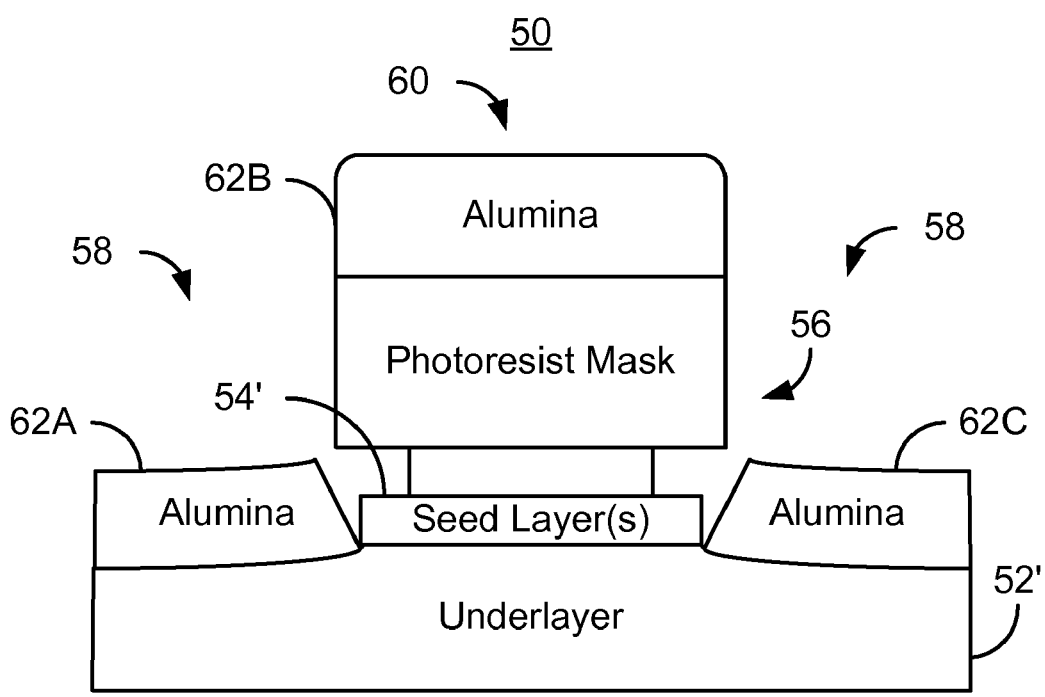
Figure 5:
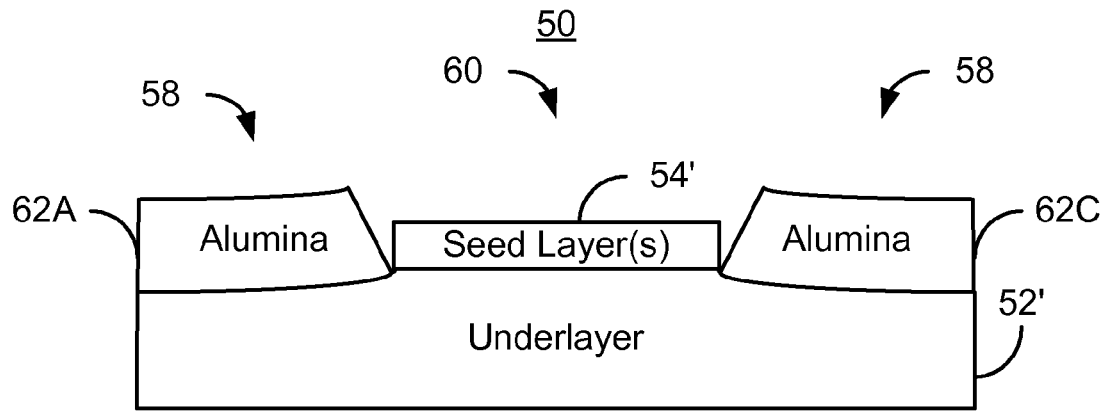
Figure 6:
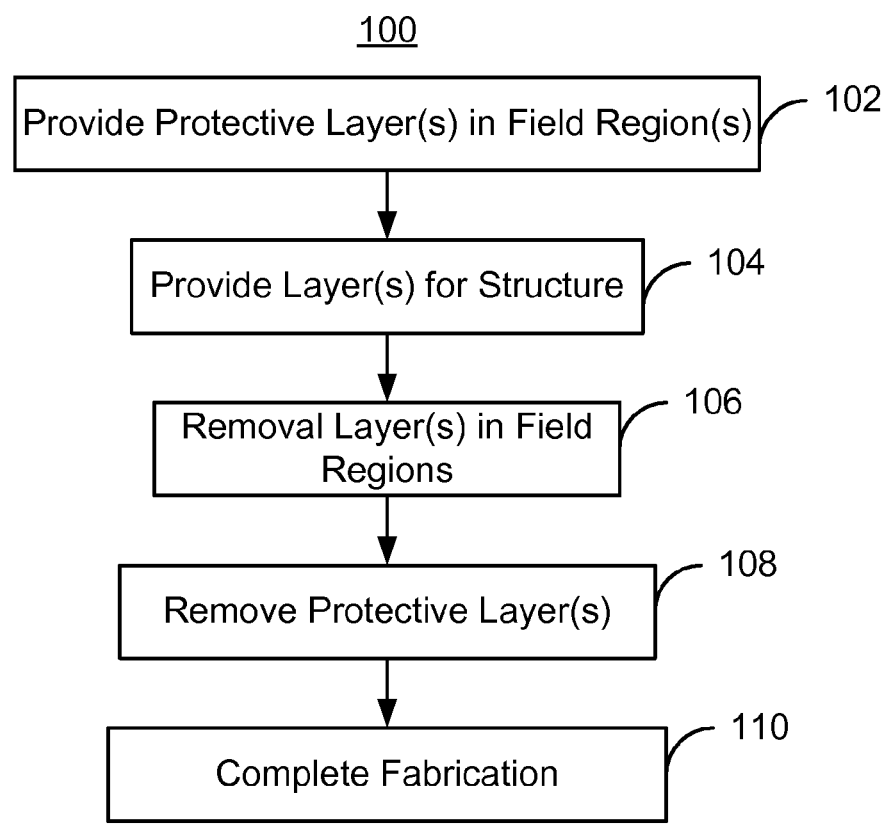
FIG. 6 is a flow chart depicting an exemplary embodiment of a method for fabricating a transducer.

FIG. 6 is a flow chart depicting an exemplary embodiment of a method 100 for fabricating a transducer. For simplicity, some steps may be omitted. The transducer being fabricated may be part of a merged head including a read transducer and a write transducer. The transducer may reside on a slider (not shown). The method 100 may be used for providing structures on either or both transducers. The method 100 is also described in the context of providing a single structure in a transducer. However, the method 100 may be used to fabricate multiple structures and/or transducers at substantially the same time.

One or more protective layers are provided on an underlayer of the transducer, via step 102. The protective layer(s) cover a field region and expose a device region, in which the structure is to reside. In one embodiment, the protective layer(s) include a diamond-like carbon (DLC) layer. The protective layer(s) might have a low removal rate in the removal step 106, described below. However, the protective layer(s) can also be removed from the underlayer using a process for which the underlayer has a significantly lower removal rate. Thus, the protective layer(s) may be removed substantially without damaging the underlayer. In one embodiment, the protective layer(s) may be provided using a lift-off process, which leaves the underlayer exposed in the device region. In an alternate embodiment, the protective layer(s) may be blanket deposited on the underlayer, then removed from the device region. In one embodiment, the underlayer on which the protective layer(s) are deposited has undergone a CMP or other planarization step. Thus, the upper surface of the underlayer may be substantially flat.

At least one layer is provided for the structure being fabricated, via step 104. In one embodiment, the layer(s) reside in the device region and the field region. In another embodiment, the layer(s) are present primarily in the device region. For example, the layer(s) provided in step 104 may include a seed layer and/or other layers for a pole. In such an embodiment, the seed layer may be magnetic and may be deposited on both the field and device regions. In such an embodiment, a portion of the seed layer may be used as a pole. In another embodiment, the layer(s) may be provided primarily in the device region, with only a small portion residing in part of the field regions. For example, in one such embodiment, the layer(s) may form the reader. This may be accomplished, for example, through the use of a photoresist mask during deposition or removal in at least part of the field regions. In one embodiment, step 104 may be performed before step 102.

The portion of the layer(s) in the field regions are removed using an over-removal condition, via step 106. In one embodiment, this is accomplished by ion milling the portion of the layer(s) in the field regions with an over-mill condition. In over-milling, ion milling continues until some time after all of the layer(s) are expected to have been removed. This ensures that the field regions are substantially devoid of the layer(s) after step 106 is completed. However, after step 106 is completed the underlayer is still covered by a remaining portion of the protective layer(s). In other words, some portion of the protective layer(s) may be removed during step 106. However, this does not expose the underlayer beneath.

The remaining portion of the protective layer(s) in the field regions is removed, via step 108. In one embodiment, in which the protective layer(s) include DLC, step 108 includes a reactive ion etch (RIE). However, the protective layer(s) were chosen so that the process used in step 108 removes the protective layer(s) at a higher rate than the underlayer. Thus, the underlayer may be substantially undamaged after step 108 is completed. Fabrication of the structure may then be completed, via step 110. Step 110 may include completing the removal-and-refill process commenced in step 102. Thus, portions the field regions may be refilled. For example, alumina, another insulator, a conductor and/or a magnetic or nonmagnetic material may be used in the refill.

Using the method 100, the layer(s) in the device region may be provided while protecting the underlayer. If the underlayer has been planarized, the top surface of the underlayer may remain substantially flat through the method 100. As a result, undesirable variations in the topology of the transducer may be reduced or eliminated. Performance of the transducer may thus be improved.

Figure 7:
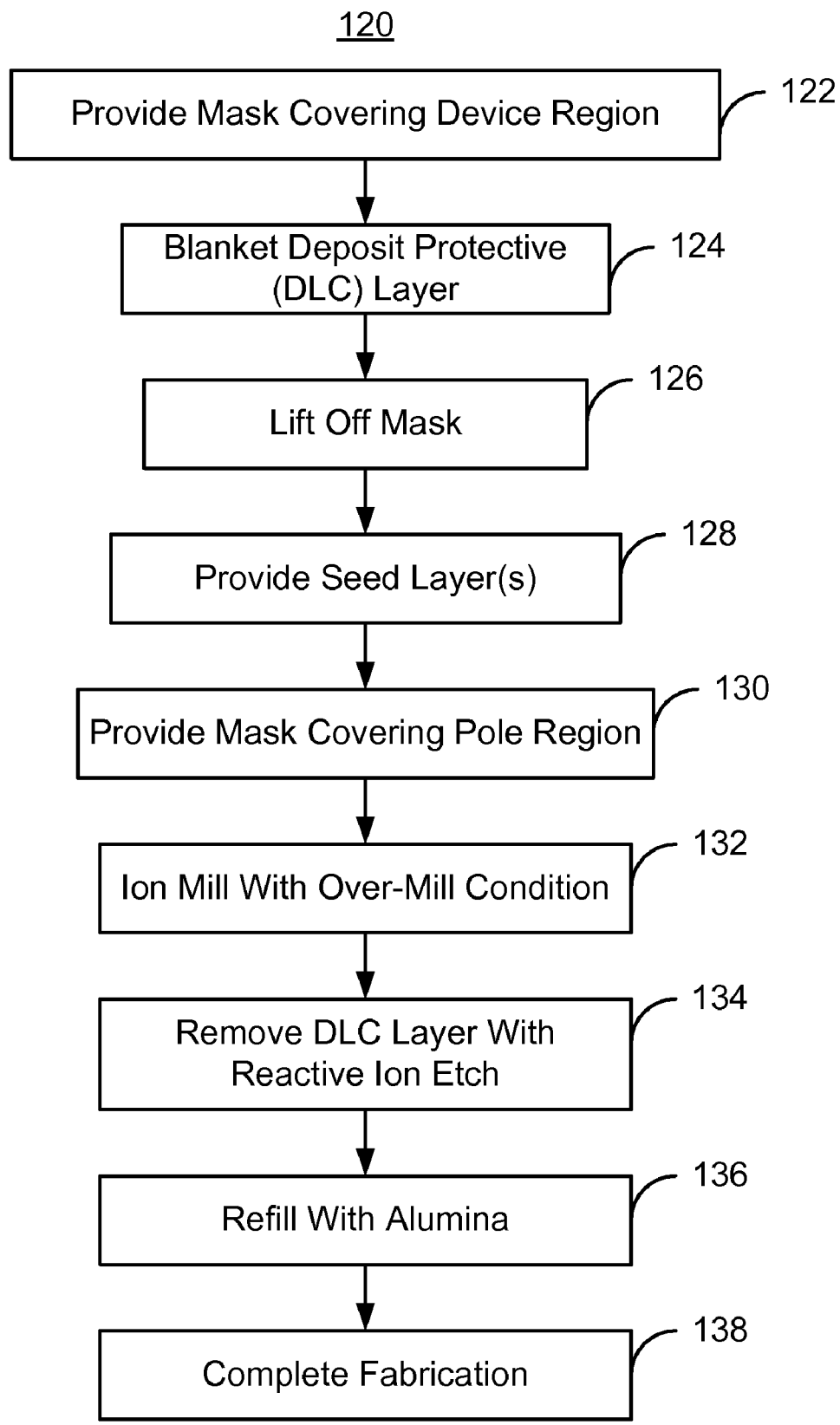
FIG. 7 is a flow chart depicting another exemplary embodiment of a method for fabricating a transducer.

FIG. 7 is a flow chart depicting another exemplary embodiment of a method 120 for fabricating structure(s) in a write transducer. The method 120 may be considered an application of the method 100. For simplicity, some steps may be omitted. FIGS. 8-14 are diagrams depicting an exemplary embodiment of a write transducer 200 during fabrication using the method 120. For clarity, FIGS. 8-14 are not to scale. The write transducer 200 may be part of a merged head also including a read transducer (not shown) and may reside on a slider (not shown). The method 120 is also described in the context of providing a single structure in a transducer. However, the method 120 may be used to fabricate multiple structures and/or transducers at substantially the same time. In addition, the method 120 is described in the context of providing a seed layer and CMP step structure through a mill-and-refill process. However, the method 120 may be used in fabricating other structures using an analogous method.

Figure 8:
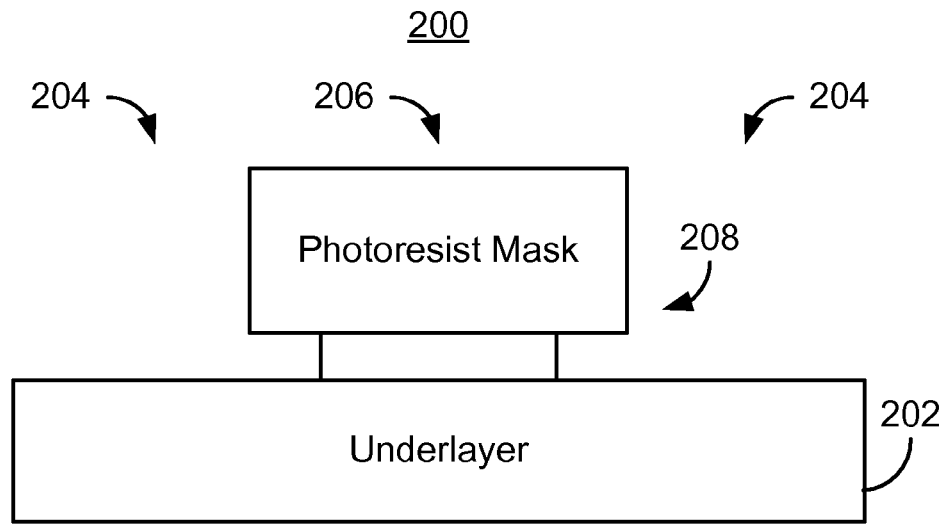
FIGS. 8-14 are diagrams depicting an exemplary embodiment of a transducer during fabrication.

A mask is provided on a planarized underlayer, via step 122. FIG. 8 depicts the transducer 200 after step 122 is completed. The transducer 200 includes a planarized underlayer 202. In addition, the mask 208 is shown. In the embodiment depicted, the mask 208 is a bi-layer photoresist mask. The mask 208 covers the device, or pole, region 206 of the magnetic recording transducer 200 and exposes the field regions 200.

Figure 9:
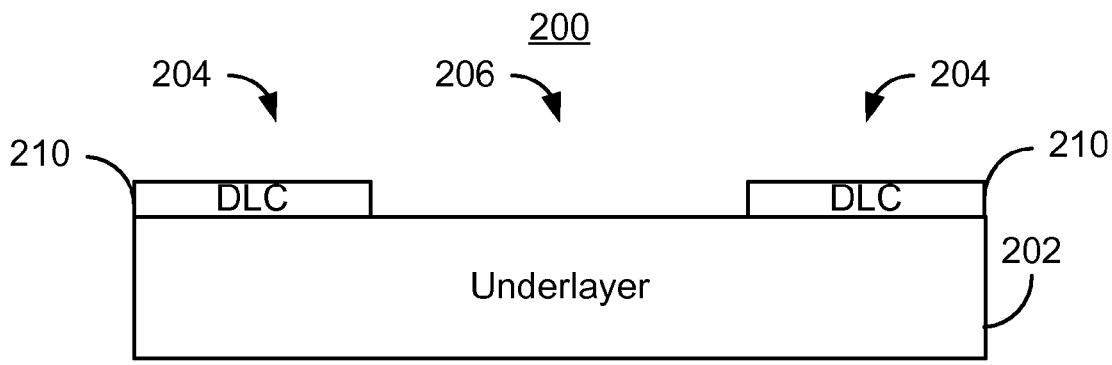

Protective layer(s) are blanket deposited, via step 124. The mask is lifted off, via step 126. FIG. 9 depicts the transducer 200 after step 126 is completed. Thus, the photoresist mask 208 has been removed. In the embodiment shown, a single protective layer, which is a DLC layer 210, has been provided. The DLC layer 210 resides in the field regions 204. However, the underlayer 202 is exposed in the pole region 206.

Figure 10:
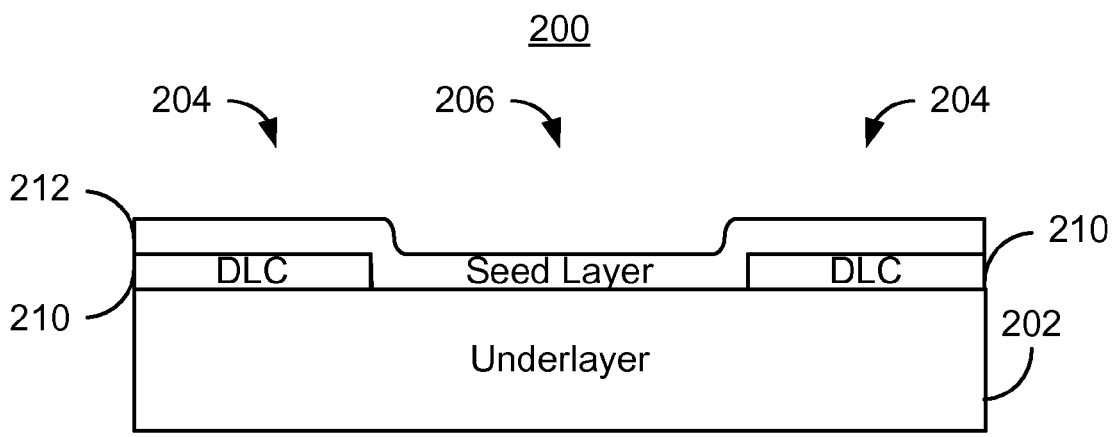

Seed layer(s) for the pole are provided, via step 128. In one embodiment, step 128 includes blanket depositing a magnetic hot seed layer that may be used as the pole. FIG. 10 depicts the transducer 200 after step 128 is completed. Thus, the seed layer 212 is shown. A portion of the seed layer 212 resides in the pole region 206, while another portion of the seed layer 212 resides in the field regions 204.

Figure 11:
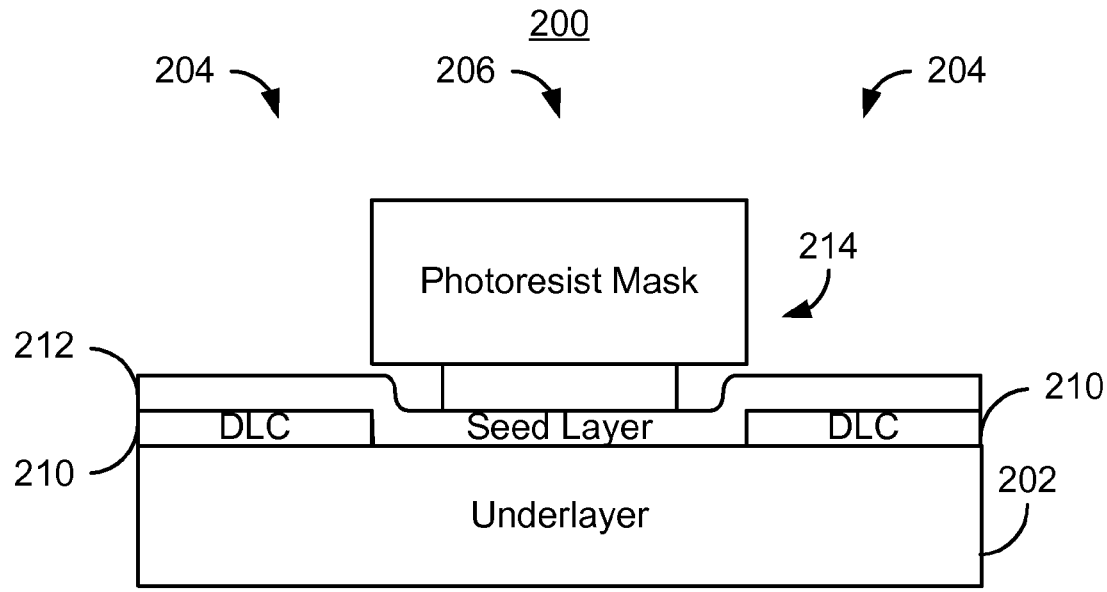

Another mask that covers the pole region 206 is provided, via step 130. FIG. 11 depicts the transducer 200 after step 130 is performed. Thus, a photoresist mask 214 is shown. In one embodiment, the mask is a bi-layer photoresist mask. The mask 214 provided in step 130 may also be the same as the mask 208 used providing the DLC layer 210. In another embodiment, the mask 214 and the mask 208 may be different. Thus, the field regions 204 are exposed, while the device region 206 is covered.

Figure 12:
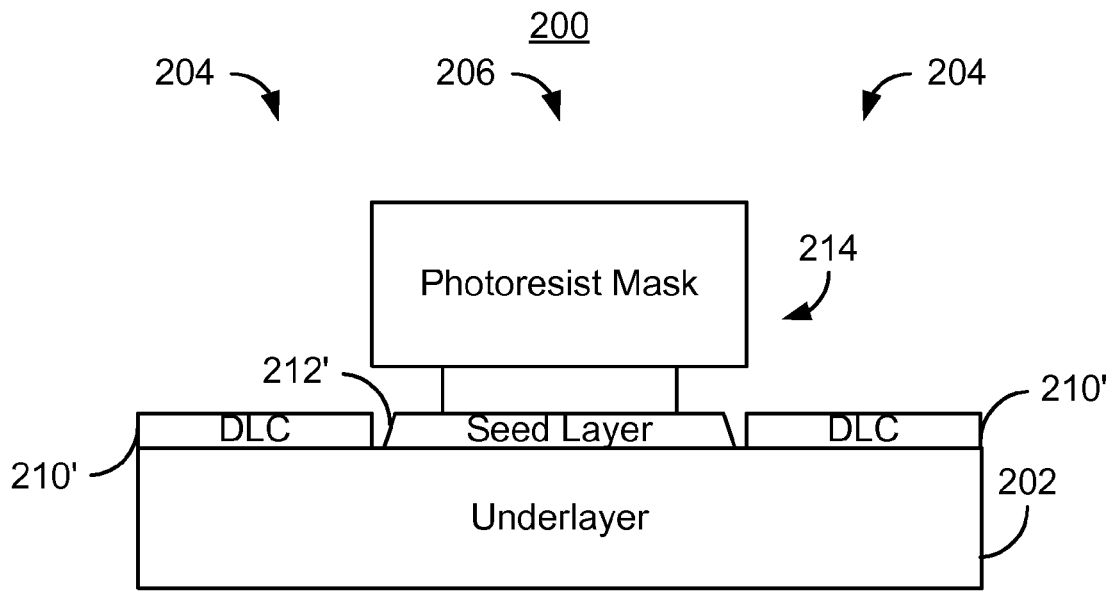

An ion mill with an over-mill condition is performed, via step 132. The over-mill condition is to remove the exposed portion of the seed layer 212 in the field regions 204. FIG. 12 depicts the transducer 200 after step 132 is performed. Thus, the seed layer 212' in the pole region 206 remains. In other words, all of the seed layer 212 that was in the field regions 204 has been removed. In the embodiment shown, the DLC layer 210' may have some portion that has been removed during step 132. However, the remaining portion of the DLC layer 21' covers the planarized underlayer 202 in the field regions 204 even after the ion milling in step 132 is completed.

Figure 13:
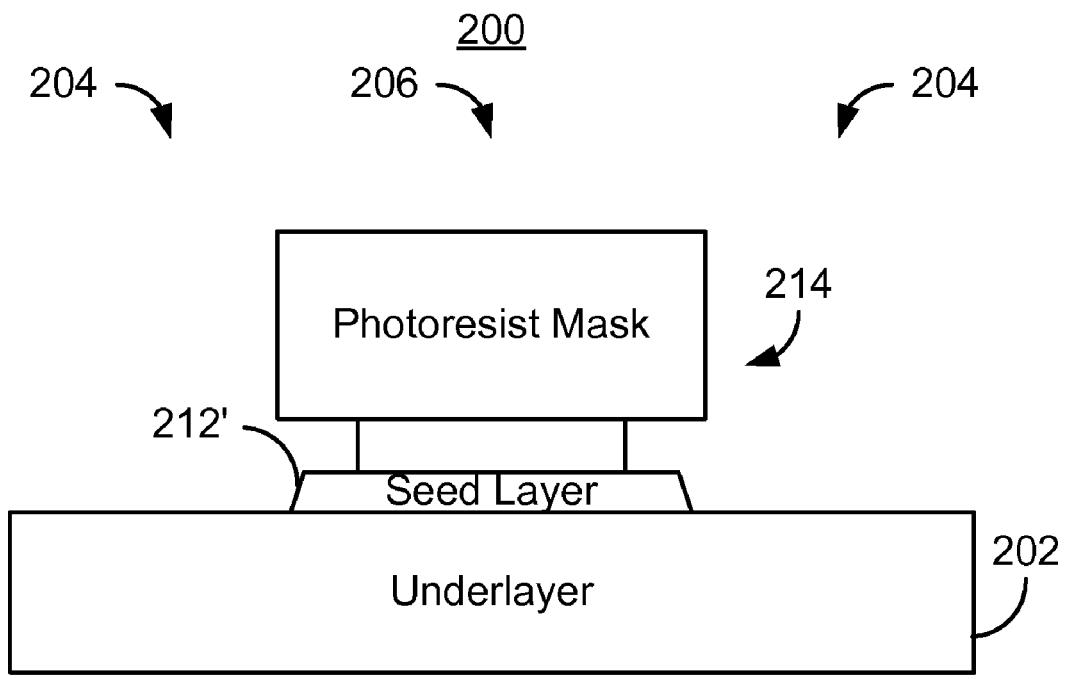

A RIE is performed to remove the DLC layer 210' in the field regions 204, via step 134. FIG. 13 depicts the transducer 200 after step 134 is completed. The removal rate of the planarized underlayer 202 is substantially less than the removal rate of the DLC 210' in an RIE. Consequently, little or no damage may be done to the planarized underlayer 202 in step 134. As shown in FIG. 13, the top surface of the underlayer 202 remains substantially flat.

Figure 14:
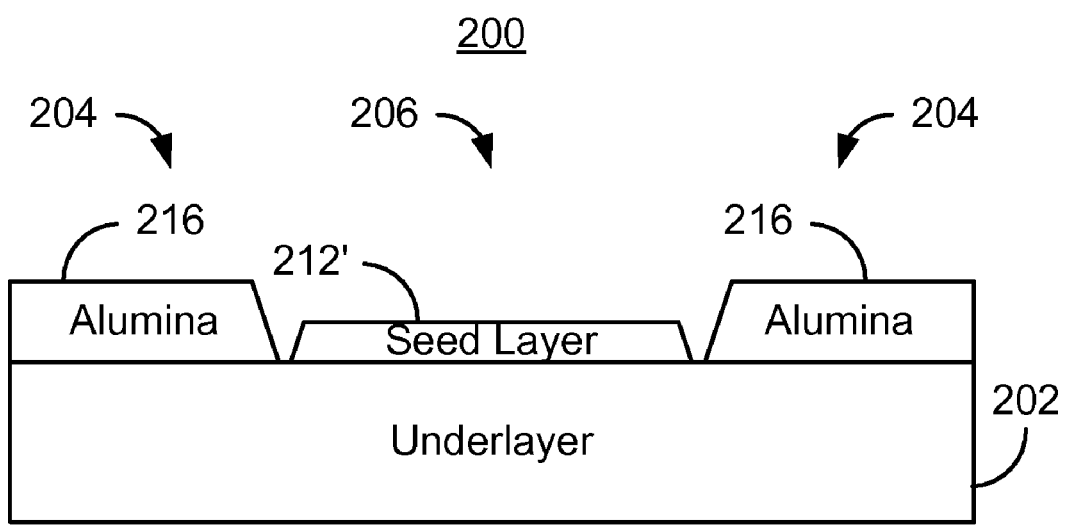

At least a portion of the field regions 204 are refilled with alumina, via step 136. In one embodiment step 136 may include removing the mask 214 after the field regions 204 have been refilled. FIG. 14 depicts the transducer 200 after step 136 is performed. In the embodiment shown, the mask 214 has been removed. The alumina layer 216 has been provided in the field regions 204. In one embodiment, not all of each of the field regions 204 is refilled in step 136. Fabrication of the transducer 200 may be completed, via step 138.

Using the method 120, the transducer 200 may be provided. Because the DLC layer 210 has been used, the overmill performed in step 132 does not adversely affect the underlayer 202. In addition, the removal of the DLC layer 210' in step 134 does not substantially affect the underlayer 202. Thus, the planarized top surface of the underlayer 202 may remain substantially undamaged. As a result, the variations in the step height of the alumina layer 216 may be reduced. Stated differently, the variations in the height of the alumina layer 216 may be primarily from the deposition tool used to form the alumina layer 216 and the planarization of the underlayer 202. This reduction in variation may result in improvements in subsequent photoresist masks used in forming the pole. Thus, the write track width and sidewall angles may be more consistent. Further, any trimming of the pole formed on the seed layer 212' may have reduced variations. Moreover, there is a more consistent step height for the alumina layer 216. Thus, any CMP performed using the step height of the alumina layer 216 may have reduced variations. Thus, fabrication and performance of the transducer 200 may be improved.

Figure 15:
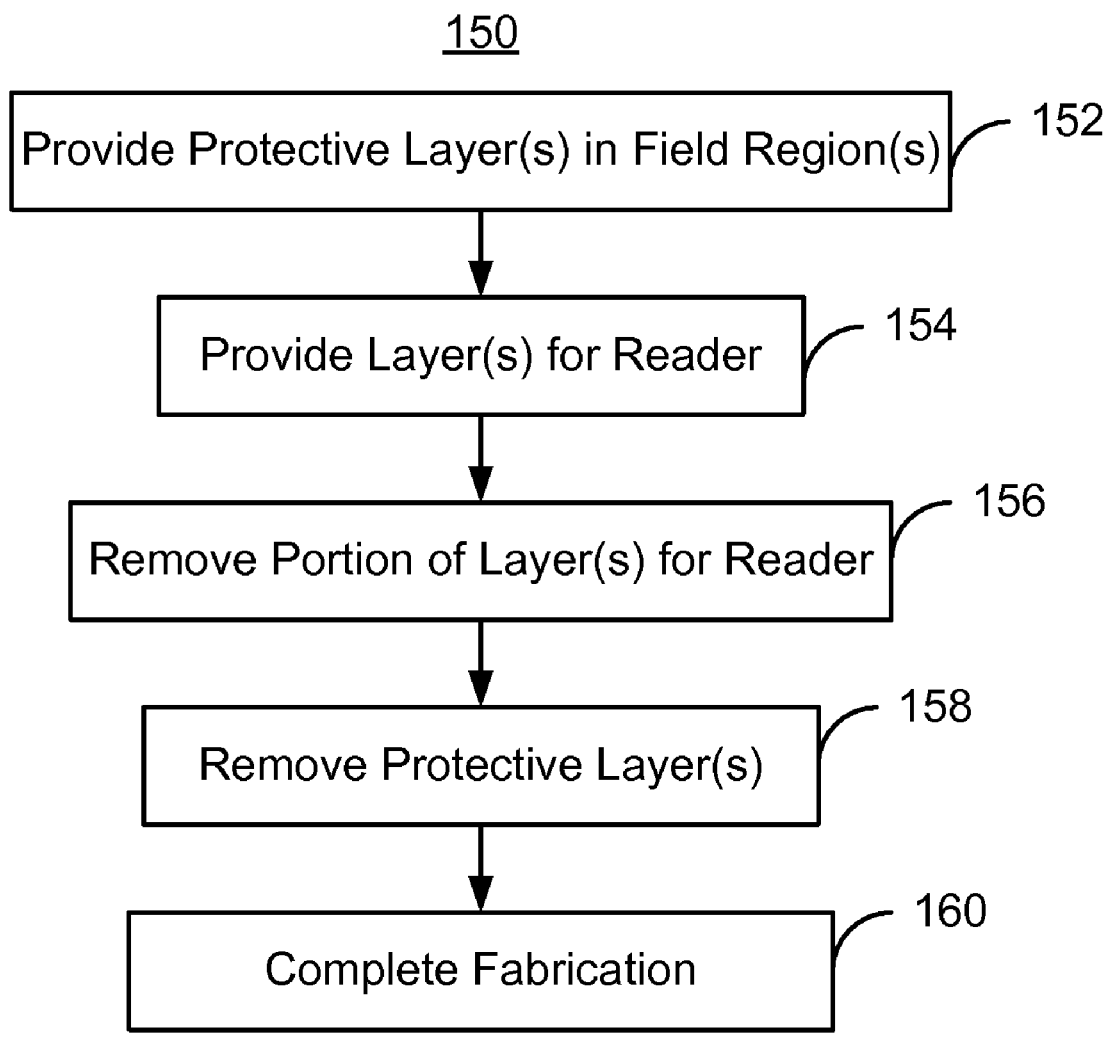
FIG. 15 is a flow chart depicting another exemplary embodiment of a method for fabricating a transducer.

FIG. 15 is a flow chart depicting another exemplary embodiment 150 of a method for fabricating a transducer. The method 150 may be considered an application of the method 100. For simplicity, some steps may be omitted. The method 150 is described in the context of providing a structure in a read transducer. The read transducer may be part of a merged head also including a write transducer (not shown) and may reside on a slider (not shown). The method 150 is also described in the context of providing a single structure in a transducer. However, the method 150 may be used to fabricate multiple structures and/or transducers at substantially the same time. In addition, the method 150 is described in the context of providing a reader. However, the method 150 may be used in fabricating other structures using an analogous method.

Protective layer(s) are provided on some underlayer, via step 152. The protective layer(s) cover field regions and expose a device region. The structure resides in the device region. In one embodiment, step 152 includes providing a DLC layer through a lift-off process. However, the protective layer(s) may be fabricated in another manner.

Layer(s) for the structure are provided, via step 154. At least a portion of the layer(s) is in the device region. In one embodiment, the layer(s) are in the device region. For example, step 154 may include providing the stripe, such as a tunneling magnetoresistive junction or a spin valve in the device region. However, in another embodiment, the layer(s) of the structure may extend into the field regions. In one embodiment, step 154 may occur before step 152. In such an embodiment, little or none of the layer(s) may reside in the field regions.

A portion of the layer(s) is removed using an ion mill, via step 156. Throughout this removal, the field regions remain covered by at least a portion of the protective layer(s). Thus, although some of the protective layer(s) in the field regions may be removed, the underlayer remains covered. In one embodiment, the layer(s) for the structure are trimmed in step 156, for example to reduce the track width.

A remaining portion of the protective layer(s) in the field region is removed, via step 158. During this step, the removal rate of the underlayer is substantially less than a removal rate of the protective layer(s). For example, if a DLC layer is used as the protective layer(s), then step 158 may include performing a RIE. In such an embodiment, the RIE removal rate for the underlayer is substantially less than that of the DLC. Fabrication of the transducer may be completed, via step 160.

Using the method 150, the layer(s) in the device region may be trimmed while protecting the underlayer. If the underlayer has been planarized, the top surface of the underlayer may remain substantially flat through the method 100. As a result, undesirable variations in the topology of the transducer may be reduced or eliminated.

We claim:

1. A method for providing a structure in a magnetic recording transducer, the structure residing on an underlayer, the method comprising;
    providing a protective layer using a first mask, the protective layer covering a field region and exposing a device region, the structure to reside in the device region;
    providing at least one layer for the structure, a first portion of the at least one layer residing in the device region and a second portion of the at least one layer residing in the field region;
    removing the second portion of the at least one layer using an over-removal condition and a second mask, at least part of the first portion of the at least one layer being covered by the second mask, a first portion of the protective layer in the field region being removed by the over-removal condition, the underlayer being covered by a remaining portion of the protective layer in the field region after the removing is completed; and
    removing the remaining portion of the protective layer;
    wherein a removal rate of the underlayer during the step of removing of the protective layer is substantially less than a removal rate of the protective layer during the step of removing the remaining portion of the protective layer in the field region.

2. The method of claim 1 wherein the protective layer comprising diamond-like carbon (DLC).

3. The method of claim 2 wherein the step of removing the remaining portion of the protective layer comprising:
    performing a reactive ion etch on the DLC.

4. The method of claim 1 wherein the step of providing the protective layer comprising:
    providing the first mask covering the device region;
    blanket depositing the protective layer; and
    lifting off the mask.

5. The method of claim 1 wherein the step of removing the second portion of the at least one layer comprising:
    ion milling the second portion of the at least one layer in the field region, the over-removal condition further including an over-mill to ensure complete removal of the second portion of the at least one layer.

6. The method of claim 1 wherein the structure comprising a pole and wherein the at least one layer further includes a seed layer.

7. The method of claim 6 wherein the seed layer includes a first portion residing in the device region and a second portion residing in the field region and wherein the removing the second portion of the at least one layer comprising:

ion milling the second portion of the seed layer in the field region, the over-removal condition including an over-mill to ensure complete removal of the second portion of the seed layer.

8. The method of claim 1 further comprising:

refilling at least a portion of the field region with a material.

9. The method of claim 8 wherein the material comprising alumina.

10. The method of claim 1 wherein the first mask is substantially the same as the second mask.

11. A method for providing a pole in a magnetic recording transducer, the pole residing on a planarized underlayer, the method comprising;

providing a first mask on the planarized underlayer, the first mask covering a pole region of the magnetic recording transducer;

blanket depositing a diamond-like carbon (DLC) layer;

lifting off the first mask, a first portion DLC layer covering a field region and exposing the pole region;

providing at least one seed layer for the pole, a first portion of the at least one seed layer residing in the device region, a second portion of the at least one seed layer residing in the field region;

providing a second mask covering first portion of the seed layer in the pole region, the second mask being substantially the same as the first mask;

ion milling the second portion of the seed layer in the field region utilizing an over-mill condition to remove the second portion of the seed layer, part of the first portion of the DLC layer in the field region being removed due to the over-mill condition, a portion of the planarized underlayer in the field region being covered by a remaining portion of the DLC layer in the field region after the ion milling is completed;

performing a reactive ion etch to remove the remaining portion of the DLC layer in the field region, a removal rate of the planarized underlayer during the reactive ion etch being substantially less than a removal rate of the of the protective layer during the reactive ion etch; and refilling at least a portion of the field region with alumina.

12. A method for providing a structure in a magnetic recording transducer, the structure residing on an underlayer, the method comprising;

providing a protective layer using a first mask, the protective layer covering a field region and exposing a device region, the structure to reside in the device region;

providing at least one layer for the structure, at least a first portion of the at least one layer residing in the device region;

removing a second portion of the at least one layer for the structure using an ion mill and a second mask, at least part of the first portion of the at least one layer being covered by the second mask, a portion of the protective layer in the field region being removed by the ion mill, the underlayer being covered by a remaining portion of the protective layer in the field region after the removing is completed; and removing the remaining portion of the protective layer;

wherein a removal rate of the underlayer during the removing of the protective layer is substantially less than a removal rate of the protective layer during the removing of the protective layer.

13. The method of claim 12 wherein the at least one layer for the structure is a portion of a read sensor.

14. The method of claim 12 wherein the first mask is substantially the same as the second mask.

* * * * *